US 6,445,909 B1

(12) United States Patent
Saeki

(10) Patent No.: US 6,445,909 B1
(45) Date of Patent: Sep. 3, 2002

(54) RADIO RECEIVER

(75) Inventor: Takao Saeki, Gunma-ken (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/450,902

(22) Filed: Nov. 29, 1999

(30) Foreign Application Priority Data

Nov. 30, 1998 (JP) .......................................... 10-340504

(51) Int. Cl.[7] .............................................. H04B 1/10
(52) U.S. Cl. ...................... 455/255; 455/255; 455/258; 455/334
(58) Field of Search ................................ 455/255, 257, 455/259, 264, 265, 195.1, 196.4, 334

(56) References Cited

U.S. PATENT DOCUMENTS

| 4,249,261 A | * | 2/1981 | Ogita ........................ 455/305 |
| 4,403,349 A | * | 9/1983 | Takayama ................... 455/219 |
| 5,548,619 A | * | 8/1996 | Horiike et al. ........... 455/192.2 |
| 6,038,268 A | * | 3/2000 | Kawai ........................ 375/334 |
| 6,188,716 B1 | * | 2/2001 | Emery et al. ............... 375/147 |

* cited by examiner

Primary Examiner—Daniel Hunter
Assistant Examiner—Thuan T. Nguyen
(74) Attorney, Agent, or Firm—Hogan & Hartson, LLP

(57) ABSTRACT

To reduce the number of signal lines in the inside of a radio receiver which determines a reference voltage based on data supplied from an external CPU, the first and second reference value data from the external CPU (1) is supplied to an input section (20) of a PLL control circuit (19), and then latched by a latch circuit (21). The latched data is converted into an analogue reference voltage in D/A converters (23, 24). The reference voltage is transferred to a radio receiving circuit (2) to be supplied to comparison circuits (16, 18) via a single line, respectively, in the inside of the radio receiving circuit (2).

8 Claims, 3 Drawing Sheets

RADIO RECEIVER

BACKGROUND OF THE INVENTION

1. Field of the Invention

The present invention relates to a radio receiver having properties desirably set according to an external CPU (Central Processing Unit).

2. Description of the Related Art

Generally, radio receivers have functional circuits, such as an RF-AGC circuit for maintaining an RF signal at a constant level according to an RF signal, an IF-AGC circuit for maintaining an RF signal at a constant level according to an IF signal, a station detection circuit for detecting presence of a broadcasting station in response to a receiving field strength equal to or more than a predetermined level, and other functions. These functions are effected based on the result of comparison between a signal level of a control object and a reference voltage. Functions to he effected based on such a comparison result is not limited to the above circuits, and may include various other circuits.

FIG. 3 shows a radio receiver including a circuit for receiving reference value data generated by a control circuit of an external CPU, and for setting a reference voltage according to the reference value data. When reference value data is transferred in series from an external CPU 1 to the radio receiver circuit 2, the reference value data is taken into a data input/output circuit 3, and the circuit 3 then outputs a control signal to, for example, a station detection circuit 4 according to the data. The station detection circuit 4 comprises a comparison circuit 5, resistors with resistance values R, 2R, 4R, and 8R, respectively, and transistors TR1 to TR4 respectively connected to the resistors. By turning on or off the transistors TR1 to TR4 in response to a control circuit, combination of the resistors R to 8R can be desirably changed so that a reference voltage can be changed depending on the combinations.

Here, in the circuit shown in FIG. 3, the data input/output circuit 3 applies a control signal for determining a reference signal to not only the station detection circuit 4, but also to an application circuit 6, such as an RF-AGC circuit, an IF-AGC circuit, or the like. That is, increase of the number of circuits requiring a reference voltage increases the number of resistors, such as a station detection circuit 4, and transistor elements, resulting in a problem such that the number of control signals to control the transistor, and thus the number of signal lines for control signals in the radio receiving circuit 2, is increased.

SUMMARY OF THE INVENTION

The present invention has been conceived to overcome the above problems and aims to provide a radio receiver for receiving electric waves from a broadcasting station, comprising a heterodyne radio receiving circuit; a frequency control circuit for controlling frequency of a local oscillation signal applied to the radio receiver in accordance with frequency data; and a control circuit for outputting the frequency data in accordance with a receiving frequency, wherein the control circuit supplies reference data to the frequency control circuit, the reference data corresponding to a reference voltage used in a different circuit in the radio receiving circuit, the frequency control circuit includes a reference voltage generation circuit for converting the reference data into reference voltage to supply to the different circuit in the radio receiving circuit.

Also, the different circuit in the radio receiving circuit may be an IF-AGC circuit.

Further, the different circuit in the radio receiving circuit may be a broadcasting detection circuit.

Still further, the control circuit may combine frequency data and reference value data, and outputs resultant data as serial data.

Yet further, the frequency control circuit may also include a latch circuit for latching the serial data supplied, so that the latched data is divided into frequency data and reference data.

Yet further, the radio receiving circuit and the frequency control circuit may be integrated on a single semiconductor substrate so that a local oscillation frequency is controlled on the substrate and a reference voltage converted is applied to the different circuit in the radio receiving circuit.

According to the present invention, reference data, as well as frequency data, is applied to a frequency control circuit for conversion therein into reference value data to be applied as a voltage signal to an application circuit of a radio receiving circuit. That is, the application circuit is coupled with only one voltage signal line.

BRIEF DESCRIPTION OF THE DRAWINGS

The above and other objects, features, and advantages of the present invention will become further apparent from the following description of the preferred embodiment taken in conjunction with the accompanying drawings wherein.

DESCRIPTION OF THE PREFERRED EMBODIMENTS

Figure 1:
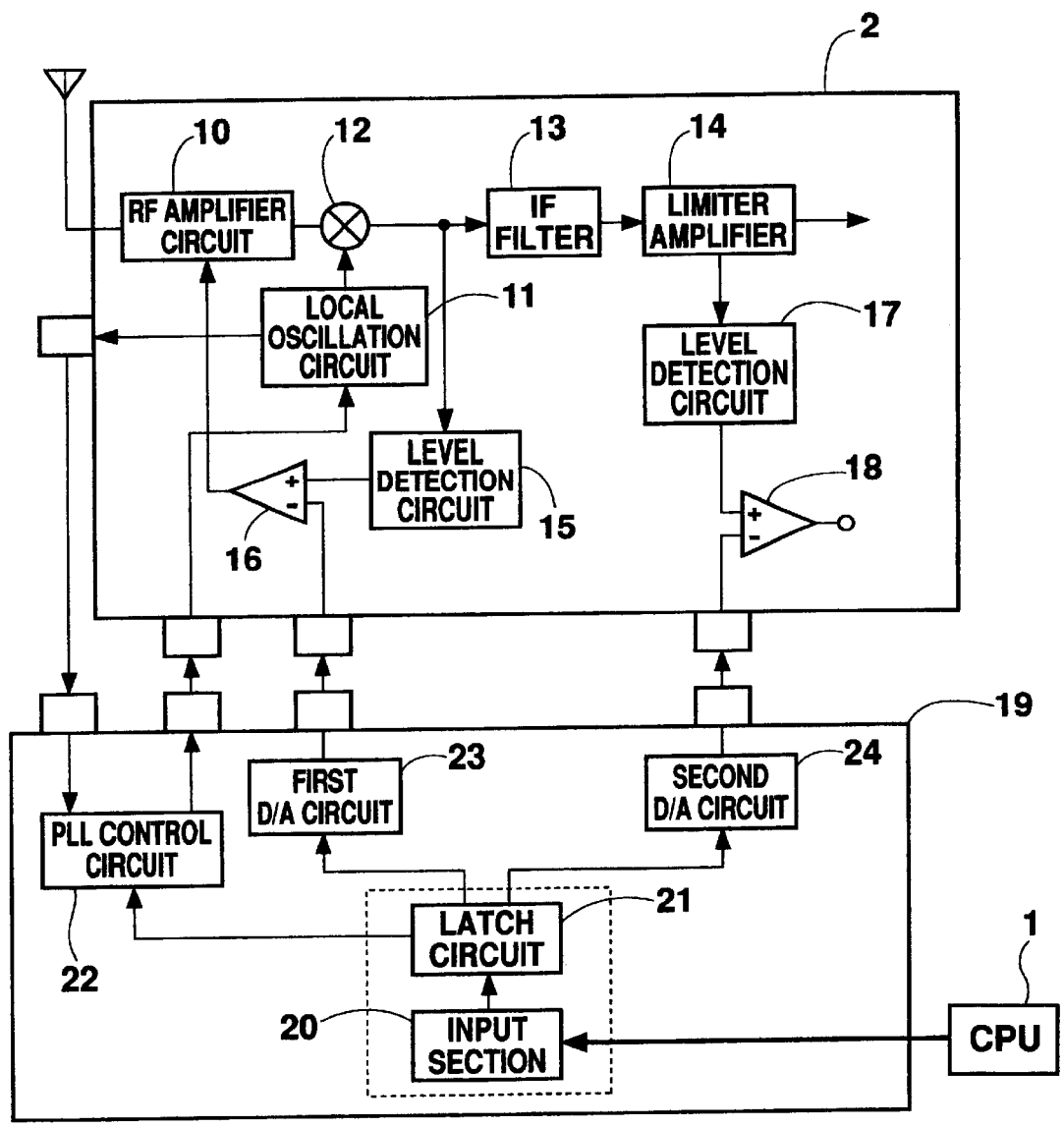
FIG. 1 is a block diagram showing a preferred embodiment of the present invention.

FIG. 1 is a diagram showing a preferred embodiment of the present invention, including an RF amplifier circuit 10 having a variable gain, for amplifying a receiving RF signal, a local oscillation circuit 11 for generating a local oscillation signal, a mixer 12 for applying frequency conversion to an RF signal into an IF signal according to a local oscillation signal, an IF filter 13 for limiting a frequency band of an IF signal, an IF limiter 14 for limiting the amplitude of an output signal from the IF filter 13, a level detection circuit 15 for detecting the level of an output signal from the mixer 12, a comparison circuit 16 for comparing an output signal from the level detection circuit 15 with a reference voltage to change the gain of the RF amplifier circuit 10 according to the comparison result, a level detection circuit 17 for detecting the level of an output signal from the IF limiter 14, and a comparison circuit 18 for comparing an output signal from the level detection circuit 17 with a reference voltage to generate a station detection signal in response the level of the output signal higher than that of the reference voltage.

The drawing further shows a PLL control circuit 19 serving as a frequency control circuit, an input section 20 for receiving data from the CPU 1, a latch circuit 21 for latching output data from the input section 18, a PLL controller 22 constituting, together with the local oscillation circuit 11, a PLL loop, for controlling the local oscillation frequency of the local oscillation circuit 11, using the latched dividing data, a first D/A converter 23 for performing D/A conversion of the latched first reference value data to generate a reference voltage for the comparison circuit 16, and a second D/A converter 24 for performing D/A conversion of the latched second reference value data to generate a reference voltage for the comparison circuit 18. Note that a reference value data, generally comprising 1 to 10 bits, comprises four bits in FIG. 1. Accordingly, the D/A converters 23, 24 are constructed so as to convert four-bit data to an analog voltage (reference voltage).

Also note that the radio receiving circuit 2 and the PLL control circuit 19 are respectively integrated in separate semiconductor substrates in FIG. 1.

The CPU 1 sends serial data including dividing data (the dividing data corresponding to the receiving frequency) and/or reference value data to the input section 20. The data supplied to the input section 20 is then transferred to the latch circuit 21 for being latched whereby the dividing data is applied to the PLL controller 22, while the first and second reference value data are supplied to the respective first and second A/D converters 23, 24. The local oscillation circuit 11 and the PLL controller 22 together constitute a PLL loop having a generally known structure. Therefore, with dividing data supplied, the local osculation circuit 22 generates a signal of a local oscillation frequency corresponding to the dividing data, so that a desired broadcasting station is received.

Meanwhile, the first reference value data is converted in the A/D converter 23 into an analogue value (voltage), which is then applied as a first reference voltage to a negative input terminal of the comparison circuit 16. The level detection circuit 15 and the comparison circuit 16 together act as an IF-AGC circuit, which uses an output signal from the A/D converter 23 as a reference voltage. An IF signal from the mixer 12 is subject to level detection in the level detection circuit 15, whose output signal is compared with a reference voltage in the comparison circuit 16. Based on an output signal from the comparison circuit 16 according to the difference obtained through the comparison, the gain of the RF amplifier circuit 10 is accordingly changed. That is, IF-AGC circuit controls such that the level of an RF signal remains equal to or less than a predetermined level. The predetermined level is determined by the reference voltage, so the level can be changed by changing a reference voltage to thereby change the target value of the IF-AG circuit.

Second reference value data is converted into an analogue second reference voltage in the D/A converter 24, and is then applied to a negative input terminal of the comparison circuit 18. An output signal from the limiter circuit 14 is subject to level detection in the level detection circuit 17, and the resultant detection output signal is compared with a second reference voltage in the comparison circuit 18. In response to a detection output signal higher than the second reference voltage, the comparison circuit 18 generates a station detection signal. The station detection signal indicates presence of a broadcast station in the receiving frequency. By changing the second reference voltage, a station detection level (a level at which a station detection signal is generated) is changed accordingly.

Here, in order to change receiving stations, dividing data is changed to thereby change a local oscillation frequency, resultantly changing the frequency of the receiving RF signal. In this case, data transfer is carried out with changed dividing data attached to the first and second reference value data identical to that before the receiving station change. As a result, only dividing data to the PLL controller 22 is changed, with reference voltage for the comparison circuits 16, 18 remaining unchanged.

In the arrangement shown in FIG. 1, as reference value data is converted into an analogue voltage (reference voltage) supplied to the radio receiver circuit, reference voltages for the comparison circuits 16, 18 are supplied via a single signal line, respectively, from the PLL control circuit 19. This enables reduction of the number of signal lines for control signals in the inside of the radio receiver circuit 2.

Also, data transfer from the CPU 1 to the PLL control circuit 19 is achieved by transferring serial data including reference value data attached to dividing data. This enables an arrangement with only a single line provided connecting the CPU1 and the PLL control circuit 19. In addition, a reference voltage can be used in other circuits. For example, when an RF-AGC circuit is included wherein an output level of the RF amplifier circuit 10 is detected and then controlled to be a reference voltage, the reference voltage can be set in the same manner as described above. Still further, the IF-AGC circuit may detect an output level of the IF filter 13 to control the RF amplifier circuit 10. A reference voltage for the IF-AGC circuit can also be set in the same manner as described above.

Figure 2:
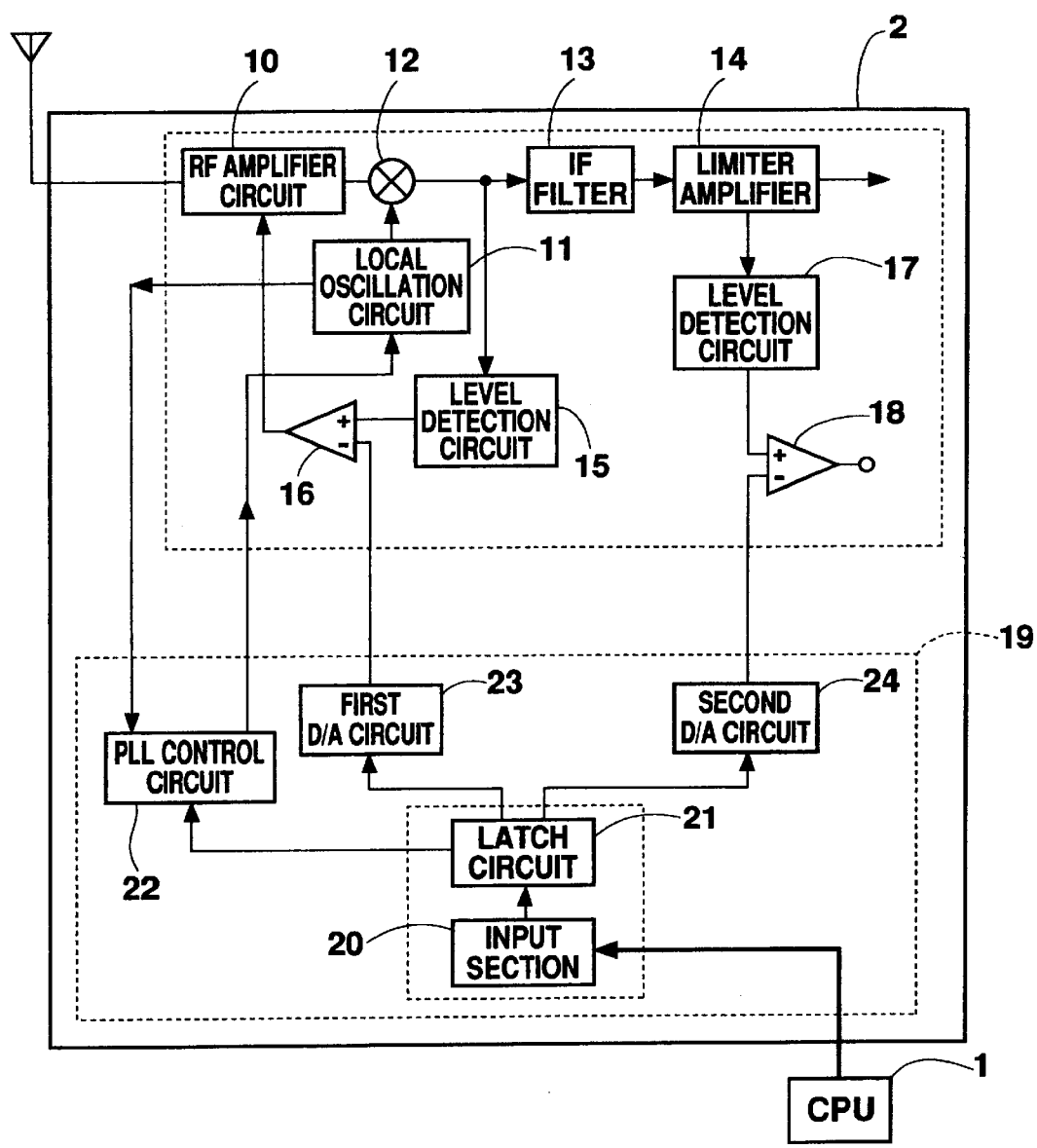
FIG. 2 is a block diagram showing another preferred embodiment of the present invention.
Figure 3:
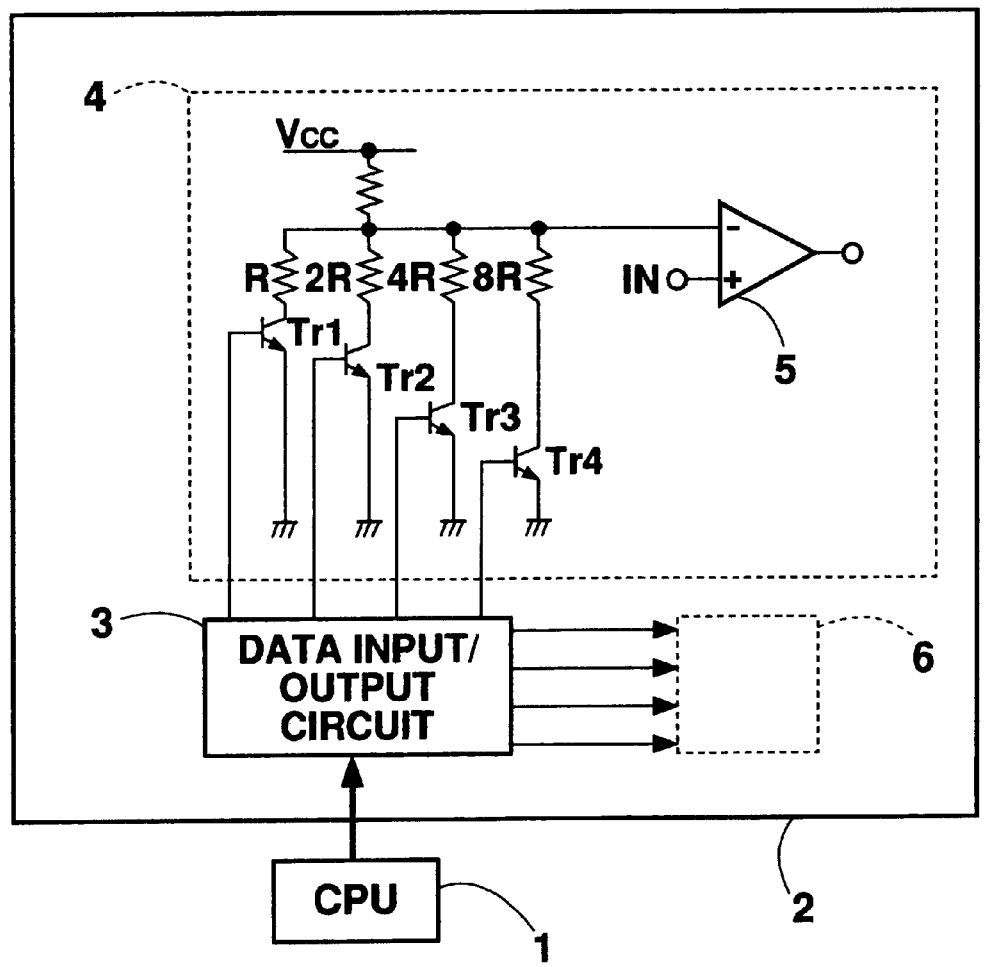
FIG. 3 is a block diagram showing a conventional radio receiver.

FIG. 2 is a diagram showing a preferred embodiment in which the radio receiving circuit 2 and the PLL control circuit 19 are formed on the same semiconductor substrate. With this structure, the frequency of a local oscillation signal can be controlled on the same semiconductor substrate according to the dividing data supplied from the CPU 1. Also, after conversion of the reference value data into a reference voltage in the PLL control circuit 19, the reference voltages are transferred to the comparison circuits 16, 18 of the radio receiving circuit 2 using a single line, respectively. This arrangement enables to reduce the number of signal lines in the inside of the radio receiving circuit 2.

Furthermore, the area for disposing the signal lines on the semiconductor substrate is reduced if the D/A converters 23, 24 are located near the input section 20 and the latch circuit 21.

The present invention can be applied not only to an FM radio receiver, as shown in FIGS. 1 and 2, but also to an AM receiver. The present invention can also be applied to not only an IF-AGC circuit and a station detection circuit, as shown in FIGS. 1 and 2, but also to a circuit requiring a reference voltage, such as an RF-AGC circuit and a circuit which changes a stereo separation extent based on field strength. In addition, the first and second D/A converting circuits 23, 24 as shown in FIGS. 1 and 2 can be replace with a decoder to generate a reference voltage.

What is claimed is:

1. A radio receiver for receiving electric waves from a broadcasting station, comprising:
   a heterodyne radio receiving circuit; and
   a frequency control circuit for controlling frequency of a local oscillation signal applied to the radio receiver in accordance with frequency data, said frequency control circuit receiving the frequency data outputted from a control circuit in accordance with a receiving frequency,
   wherein
   the frequency control circuit includes a reference voltage generation circuit for converting a plurality of reference data received from the control circuit into a plurality of reference voltages to supply one of the reference voltages to a different circuit to be compared with a detected voltage level in the radio receiving circuit.

2. A radio receiver according to claim 1, wherein the different circuit in the radio receiving circuit is an IF-AGC circuit.

3. A radio receiver according to claim 1, wherein the different circuit in the radio receiving circuit is a broadcasting detection circuit.

4. A radio receiver according to claim 1, wherein the frequency data and the plurality of reference data are combined into serial data prior to being received by the frequency control circuit.

5. A radio receiver according to claim 4, wherein the frequency control circuit includes a latch circuit for latching the serial data supplied, so that the latched data is divided into the frequency data and the plurality of reference data.

6. A radio receiver according to claim 1, wherein the radio receiving circuit and the frequency control circuit are integrated on a single semiconductor substrate so that a local oscillation frequency is controlled on the substrate and one of the reference voltages converted is applied to the different circuit in the radio receiving circuit.

7. The radio receiver according to claim 1, wherein one of the plurality of reference voltages is provided to an IF-AGC circuit and is used as a reference voltage for determining a gain of an RF amplifier circuit of the radio receiver.

8. The radio receiver according to claim 1, wherein one of the plurality of reference voltages is provided to a level detection circuit and is used as a reference voltage for determining the presence of a broadcast station according to the receiving frequency.

* * * * *